United States Patent [19]
Kojima et al.

[11] Patent Number: 5,921,138
[45] Date of Patent: Jul. 13, 1999

[54] BICYCLE SHIFT DEVICE HAVING A LINEARLY SLIDING SHIFT LEVER

[75] Inventors: Masao Kojima; Kenji Ose, both of Sakai, Japan

[73] Assignee: Shimano, Inc., Osaka, Japan

[21] Appl. No.: 08/807,282

[22] Filed: Feb. 27, 1997

Related U.S. Application Data

[63] Continuation-in-part of application No. 08/599,985, Feb. 14, 1996, abandoned.

[51] Int. Cl.$^6$ ............................ B62M 25/04; B62K 23/06
[52] U.S. Cl. .................................... 74/473.13; 74/473.14; 74/489; 74/502.2
[58] Field of Search ................................. 74/142, 473.13, 74/473.14, 489, 502.2

[56] References Cited

U.S. PATENT DOCUMENTS

| | | | |
|---|---|---|---|
| 4,900,291 | 2/1990 | Patterson | 474/80 |
| 5,012,692 | 5/1991 | Nagano | 74/142 X |
| 5,095,768 | 3/1992 | Nagano | 74/475 |
| 5,102,372 | 4/1992 | Patterson et al. | 474/80 |
| 5,203,213 | 4/1993 | Nagano | 74/475 |
| 5,421,219 | 6/1995 | Tagawa et al. | 74/302.2 |

FOREIGN PATENT DOCUMENTS

| | | |
|---|---|---|
| 977332 | 3/1951 | France . |
| 3200562 A1 | 7/1983 | Germany . |
| 3826635 A1 | 2/1990 | Germany . |
| 43-11680 | 5/1943 | Japan . |
| 48-24188 | 7/1973 | Japan . |
| 2-225191 | 9/1990 | Japan . |
| 488002 | 6/1938 | United Kingdom . |
| 2169065 | 7/1986 | United Kingdom . |

OTHER PUBLICATIONS

Shimano Bicycle System Components, Apr. 1982, p. 120.
U.S. application No. 08/599,985, Kojima, filed Feb. 14, 1996.
U.S. application No. 08/601,098, Furuta, filed Feb. 14, 1996.
U.S. application No. 08/706,649, Yamane, filed Sep. 4, 1996.

*Primary Examiner*—Allan D. Herrman
*Attorney, Agent, or Firm*—James A. Deland

[57] ABSTRACT

A bicycle shifter operating device for operating a shifting mechanism via a transmission element includes a control body for mounting to a bicycle in close proximity to a handlebar for controlling a pulling and releasing of the transmission element. A first lever is mounted to the control body for movement which causes the control body to effect pulling of the transmission element, and a second lever is mounted to the control body for movement which causes the control body to effect releasing of the transmission element. One lever may be pivotally coupled to the control body, and the other lever may be coupled for linear movement relative to the control body. The lever structured for linear movement may be coupled to a transmission mechanism for operating the control body in such a way that very little linear movement is needed to operate the control body. The transmission mechanism may include a plurality of ratchet teeth disposed in a common plane, where the path of movement of the linear operating body is parallel to the plane of the ratchet teeth. With such a structure, the finger contacting part associated with the linearly moving lever may be placed in front of the handlebar (by curving the body of the lever, if necessary) so that the finger contacting part moves toward the handlebar in operation without striking the handlebar. As a result, both levers may be operated by the cyclist's thumb without movement of any other fingers or the palm from the handlebar.

22 Claims, 13 Drawing Sheets

BICYCLE SHIFT DEVICE HAVING A LINEARLY SLIDING SHIFT LEVER

This application is a continuation-in-part of application no. 08/599,985 filed Feb. 14, 1996, now abandoned entitled "Bicycle Shift Levers Which Surround a Handlebar."

BACKGROUND OF THE INVENTION

The present invention is directed to a bicycle shifting device which operates a shifting mechanism via a shifter cable, and specifically concerns a device in which a take-up body that takes up the shifter cable is caused to rotate in the take-up direction by means of a first shift lever which freely returns to a home position, and is caused to rotate in the pay-out direction by means of a second shift lever which freely returns to a separate home position.

A bicycle shifter operating device equipped with first and second shift levers such as those described above is known (for example) from Japanese Patent Application Kokai No. 4-183696. In this shifter operating device, the first shift lever and the second shift lever can pivot about a common pivoting axis wherein the operating direction of the first shift lever is clockwise and the operating direction of the second shift lever is counterclockwise. The first shift lever is arranged so that it can be operated by the thumb of the hand gripping the handlebar, and the second shift lever is arranged so that it can be operated by the index finger of the hand gripping the handlebar. In such shifting devices the first and second levers typically pivot about an axis that is perpendicular to the handlebar.

During high performance riding on rough terrain it is often desirable to keep the hands as firmly positioned on the handlebars as possible. However, when using the above shifting devices it is necessary to remove the index finger from the handlebar in order to operate the second shift lever. Some cyclists find the movement of the index finger in such cases undesirable.

Some shifting devices are constructed as shown in U.S. Pat. No. 4,900,291 wherein the shifting operation is performed by rotating a sleeve mounted coaxially with the handlebar. Unfortunately, if the hand is maintained in position around the sleeve while riding there is a risk of unintended shifting when encountering rough terrain. If the hand is ordinarily kept in position on the rigid portion of the handlebar, then the entire hand must be removed from the handlebar to grasp the sleeve during shifting, which is even more undesirable. Thus, there is a need for a shifting device which allows the hand to be firmly positioned on the handlebar at all times with a minimum of movement during shifting.

Another ergonomic consideration of shifting devices is the sensory feedback provided by the shifting device. Some cyclists prefer a shifting device which provide very different sensory feedback between the upshifting and downshifting operations. For those cyclists a shifting device with two pivoting levers does not provide sufficient sensory difference between the upshifting and downshifting operation, since both levers pivot. The same is true with shifting devices constructed with a rotating sleeve, since both upshifting and downshifting is performed by rotating the sleeve.

A bicycle shifter operating device in which the first shift lever is operated by pivoting and the second shift lever is operated by means of a button in order to achieve a clear sensory difference between the shifter cable take-up operation and the shifter cable pay-out operation is known from British Patent Disclosure No. 2,169,065 (corresponding to Japanese Patent Application Kokai No. 61-222889). In this shifter operating device, a pivoting lever is used when the take-up body is to be rotated in the direction which takes up the shifter cable. When the take-up body is to be rotated in the direction which pays out the shifter cable (using the driving force of a return spring), the cable is returned one speed at a time by means of a button-operated sliding pawl. Here, the shifter cable take-up operation is accomplished by a pivoting action, while the shifter cable pay-out operation is accomplished by a sliding action. Accordingly, there is a clear sensory difference between the two operations. Unfortunately, because of structural limitations, the pivoting lever and the button-operated part must be installed in completely different locations. Accordingly, it is difficult to perform both shifting operations using the fingers of the hand gripping the handlebar without undesirable movement of the hand.

Yet another ergonomic consideration is the placement of the finger contacting portions of the shift levers. When a shift lever is to be operated by the thumb, the shift lever should be placed in a position that does not require awkward movement of the thumb. This is especially true when separate shift levers are provided for upshifting and downshifting. Some riders prefer thumb operated shift levers to be located at the approximate plane of the palm. Unfortunately, the approximate plane of the palm usually corresponds to the location of the handlebar, and it is not feasible to mount conventional shift levers in front of the handlebar. That is because conventional shift levers require a relatively large swing angle to operate, and it would be necessary to mount the lever a great distance forward of the handlebar to prevent the lever from striking the handlebar during operation. This, in turn, would destroy the ergonomic positioning of the lever.

SUMMARY OF THE INVENTION

The present invention is directed to a bicycle shifting device which allows the shifting operation to be performed without undesirable movement of the hand and which also can be constructed to provide very different sensory feedback between the upshifting and downshifting operations. In one embodiment of a bicycle shifter operating device according to the present invention for operating a shifting mechanism via a transmission element, a control body is provided for mounting to a bicycle in close proximity to a handlebar for controlling a pulling and releasing of the transmission element. A first lever is mounted to the control body for movement which causes the control body to effect pulling of the transmission element, and a second lever is mounted to the control body for movement which causes the control body to effect releasing of the transmission element. Both levers may be operated by the cyclist's thumb without movement of any other fingers or the palm from the handlebar. The control body may be mounted to a bracket used for mounting a brake lever to the bicycle, thus allowing the shifting levers to be placed very close to the brake lever to facilitate shifting while braking.

In a more specific embodiment, one lever may be pivotally coupled to the control body, and the other lever may be coupled for linear movement relative to the control body. This embodiment maximizes the difference in sensory feedback between upshifting and downshifting (i.e., sliding vs. pivoting) while still allowing the shifting operation to be accomplished without excessively moving the fingers and palm from the handlebar. The lever structured for linear movement may be coupled to a transmission mechanism for operating the control body in such a way that very little linear movement is needed to operate the control body. The transmission mechanism may include a plurality of ratchet teeth disposed in a common plane, where the path of movement of the linear operating body is parallel to the plane of the ratchet teeth. With such a structure, the finger contacting part associated with the linearly moving lever may be placed in front of the handlebar (by curving the body of the lever, if necessary) so that the finger contacting part moves toward the handlebar in operation without striking the handlebar. As a result, both levers may be placed near the plane of the rider's palm.

DETAILED DESCRIPTION OF THE EMBODIMENTS

Figure 1:
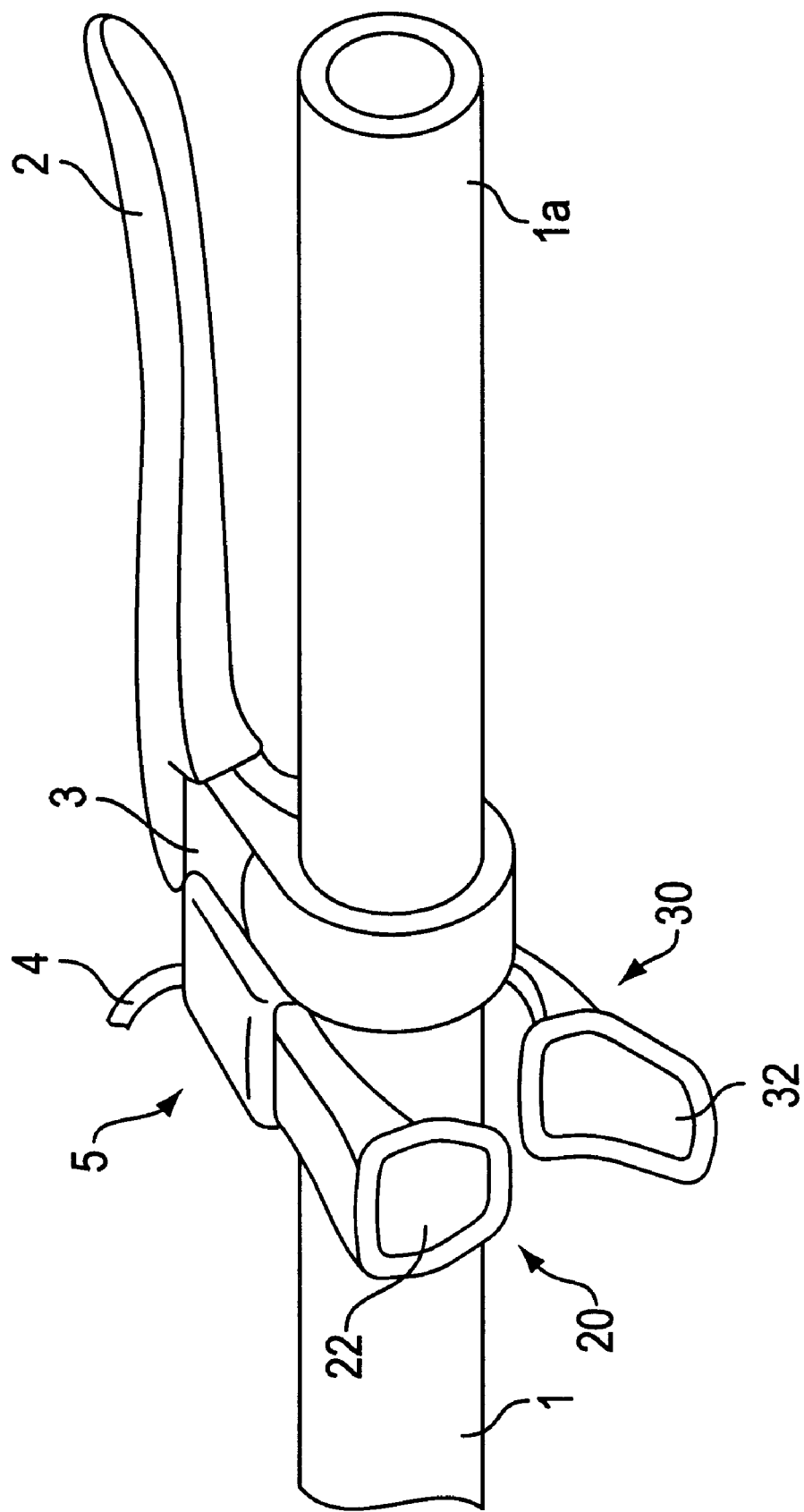
FIG. 1 is a perspective view showing a particular embodiment of a shifter operating device according to the present invention attached to a brake bracket.

FIG. 1 is a perspective view showing a particular embodiment of a shifter operating mechanism according to the present invention. As shown in FIG. 1, a brake bracket 3 which pivotally supports a brake lever 2 is fastened in place adjacent to a grip 1a formed on the handlebar 1 of a bicycle. A shifter operating device 5 which pulls and releases a shifter cable 4 is attached to the side surface of this brake bracket 3. The arm-shaped sliding operating body 20 of the shifter operating device 5 extends above the handlebar 1, and the pivoting operating body 30 of the shifter operating device 5 extends beneath the handlebar 1, so that operation of both levers is possible with the thumb of the hand gripping the handlebar grip 1a.

Figure 2:
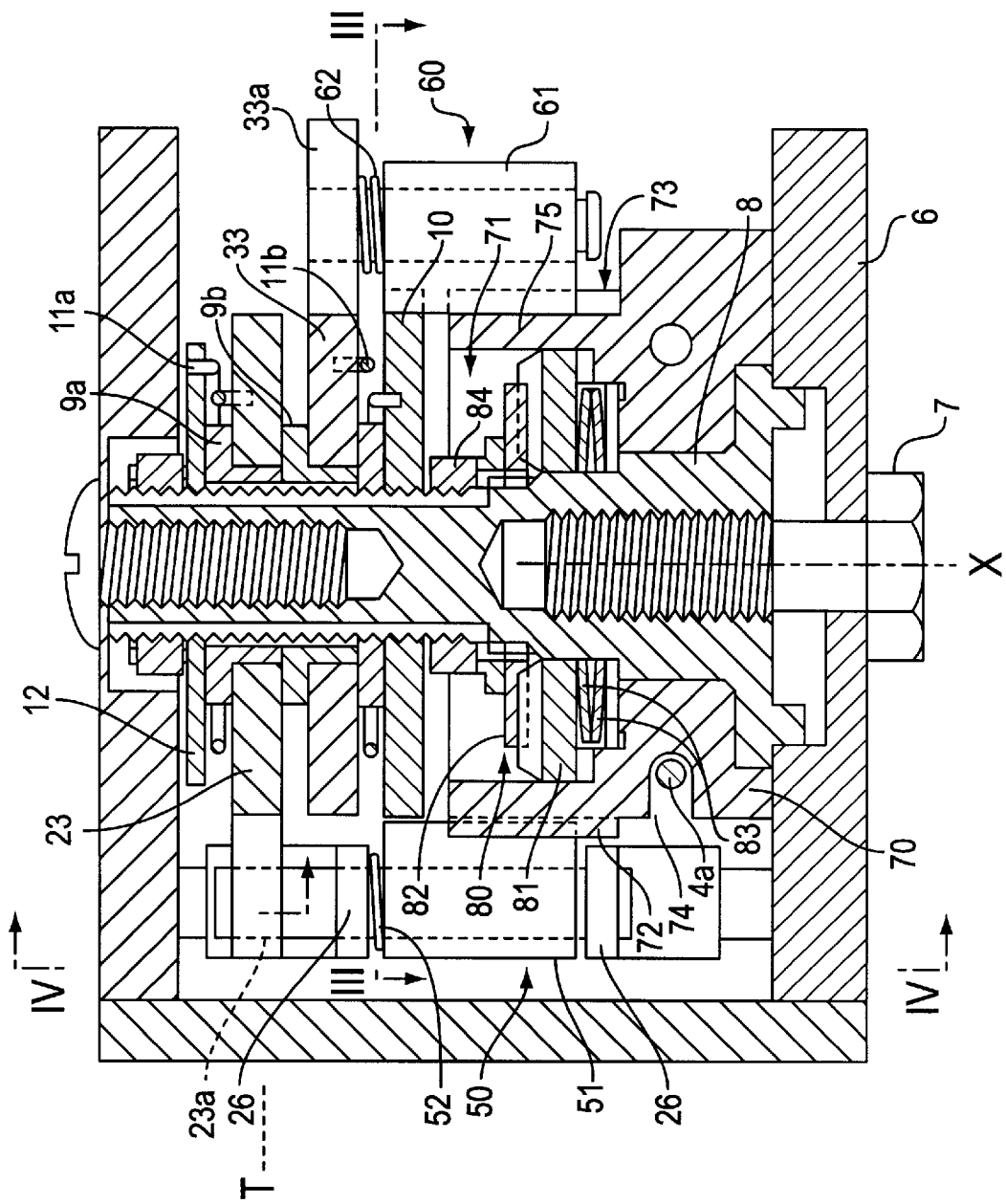
FIG. 2 is a sectional view of the shifter operating device taken along line II—II in FIG. 3.
Figure 3:
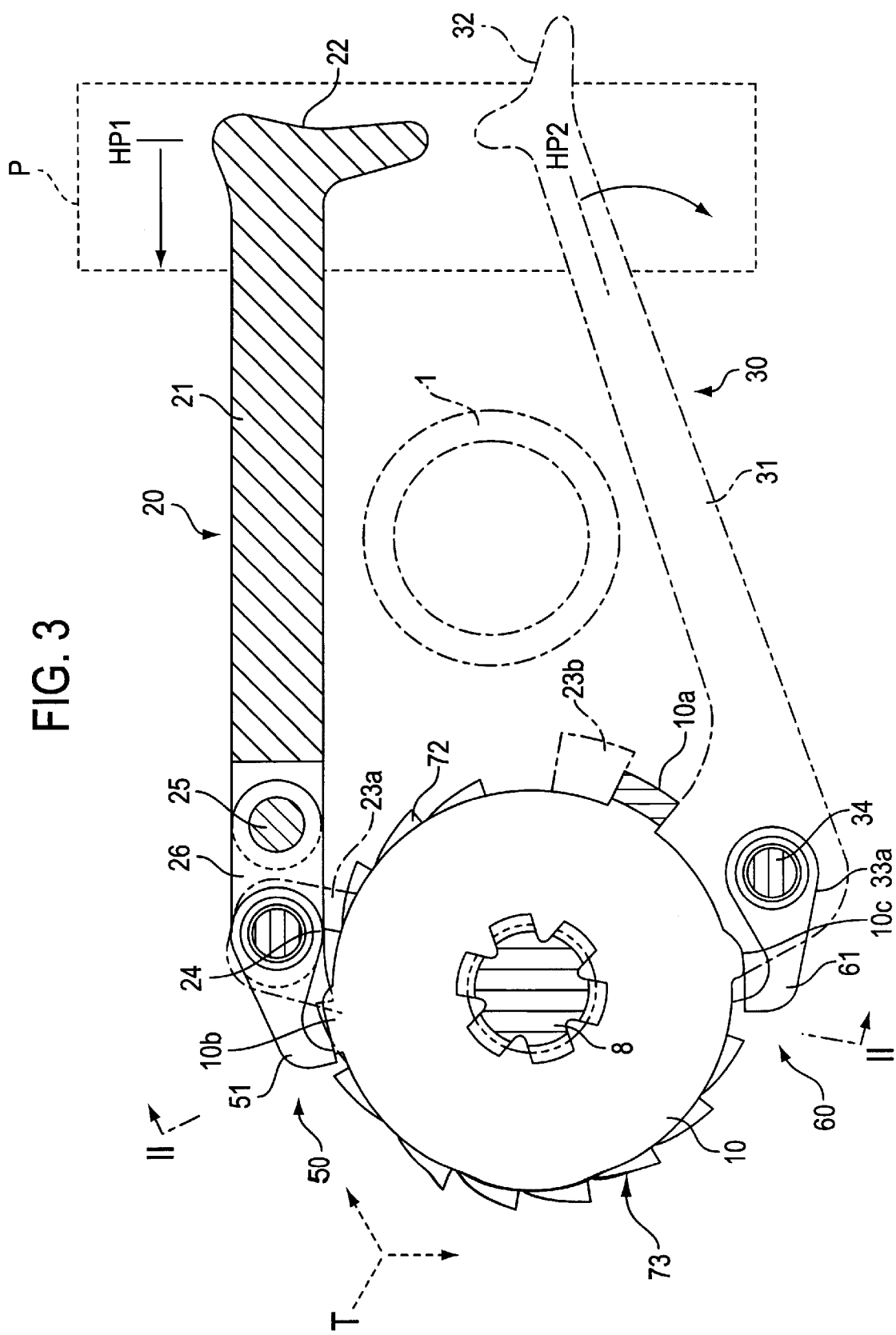
FIG. 3 is a sectional view of the shifter operating device taken along line III—III in FIG. 2.

As is shown in FIGS. 2 and 3, the shifter operating device 5 includes a supporting shaft 8 which is rigidly fastened by means of an attachment bolt 7 to a bracket 6 which, in turn, may be formed as an integral part of the brake bracket 3. A take-up body 70 is attached to the base end of supporting shaft 8, and a positioning mechanism 80 is built into a recessed area 71 formed in take-up body 70. A first ratchet mechanism 50, used as a first transmission means, transmits the displacement of a sliding operating body 20 to the take-up body 70 to cause the rotation of the take-up body 70 in one direction, and a second ratchet mechanism 60, used as a second transmission means, transmits the displacement of a pivoting operating body 30 to the take-up body 70 to cause the rotation of the take-up body 70 in the other direction.

Figure 4:
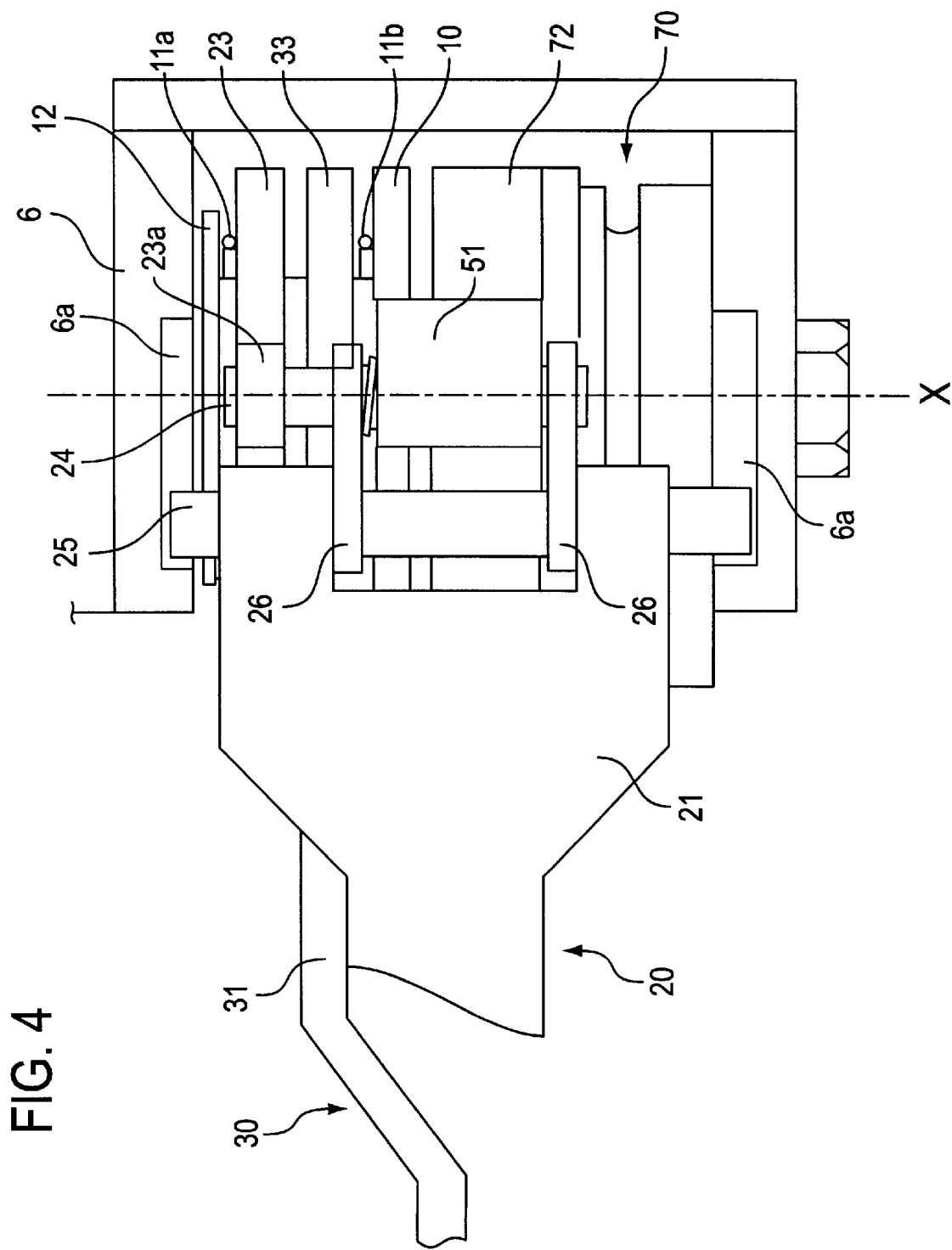
FIG. 4 is a sectional view of the shifter operating device taken along line IV—IV in FIG. 2.

As shown in FIGS. 2, 3 and 4, the sliding operating body 20 is equipped with a first arm part 21 which forms the main part of the sliding operating body, a first finger contact part 22 which is formed on the tip of the first arm part 21 in order to allow finger operation, a rotating plate 23 (constituting a root part) which is supported on the supporting shaft 8 so that the plate 23 can rotate about the supporting shaft 8, and a pair of link members 26 which link the first arm part 21 with a projecting part 23a of the rotating plate 23 via pivot pins 24 and 25. The pivoting operating body (30) is equipped with a second arm part 31 which forms the main part of the pivoting operating body, a second finger contact part 32 which is formed on the tip of the second arm part 31 in order to allow finger operation, and a rotating plate 33 (constituting a root part) which is supported on the supporting shaft 8 so that the plate 33 can rotate about the supporting shaft 8.

The first ratchet mechanism 50 is equipped with a first feeding pawl 51 which is rotatably attached to the pivot pin 24, a first ratchet part 72 which is formed on the outer circumferential surface of the take-up body 70 so that the ratchet part 72 can engage with the feeding pawl 51, and a spring 52 which drives the first feeding pawl 51 in the direction of engagement. In this embodiment, first ratchet part 72 includes a plurality of ratchet teeth disposed in a common plane (T) as shown in FIGS. 2 and 3. The second ratchet mechanism 60 is equipped with a second feeding pawl 61 which is rotatably attached to a pivot pin 34 installed on the transitional part 33a between the rotating plate 33 and second arm part 31, a second ratchet part 73 which is formed on the outer circumferential surface of the take-up body 70 so that the ratchet part 73 can engage with the feeding pawl 61, and a spring 62 which drives the second feeding pawl 61 in the direction of engagement.

The take-up body 70 is equipped with a drum part which is constructed so that the inner wire 4a of the shifter cable 4 from a shifting mechanism (not shown) on the front or rear of the bicycle is taken up along a wire groove 74. By rotating in the forward direction or reverse direction with respect to the supporting shaft 8, the take-up body 70 takes up or pays out the inner wire 4a.

As is shown in FIG. 4, the first arm part 21 of the sliding operating body 20 is linked with the rotating plate 23 by means of the link members 26 and pivot pin 24. Both ends of the pivot pin 24 are extended, and the extended end portions are inserted into grooves 6a formed in the bracket 6. Accordingly, the first arm part 21 is guided by the grooves 6a, and performs a linear sliding motion. As a result of this sliding motion, the rotating member 23, which is pivotably fit over the supporting shaft 8 via a bush 9a, is caused to pivot about the axial center X of the supporting shaft 8.

Figure 5:
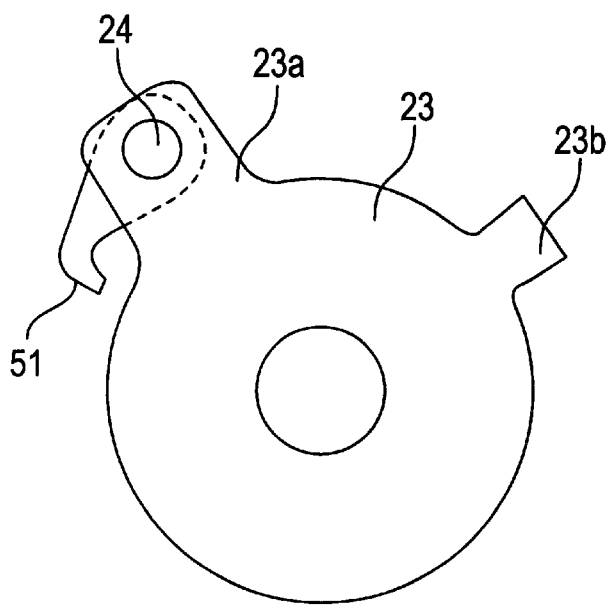
FIG. 5 is a side view of a particular embodiment of a rotating plate of the sliding operating body shown in FIG. 3.

As shown in FIG. 5, the rotating plate 23 has a projection 23b which projects radially outward. This projection 23b is designed so that it will contact one side surface of a stopper 10a formed by bending a circumferential projecting part 10a of a cam member 10 which is attached to the supporting shaft 8 in the pivoting track of the projection 23b. Rotating plate 23 is driven by a return spring 11a which engages a stationary plate 12 in the direction which causes contact between the projection 23 and the stopper 10a. The position in which the projection 23b and stopper 10a are in contact with each other constitutes the home position HP1 of the rotating plate 23 and the sliding operating body 20. The sliding operating body 20 is operated with this home position as a starting point.

Figure 6:
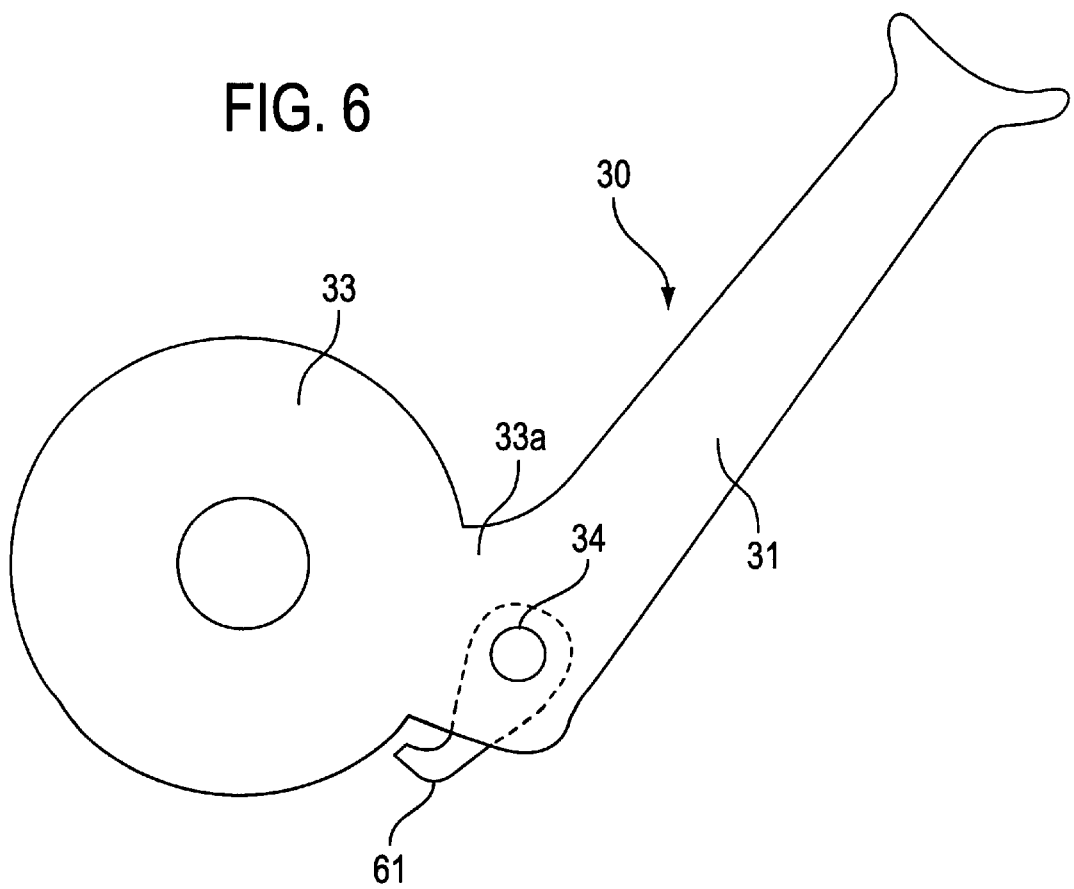
FIG. 6 is a side view of a particular embodiment of the pivoting operating body shown in FIG. 3.
Figure 7:
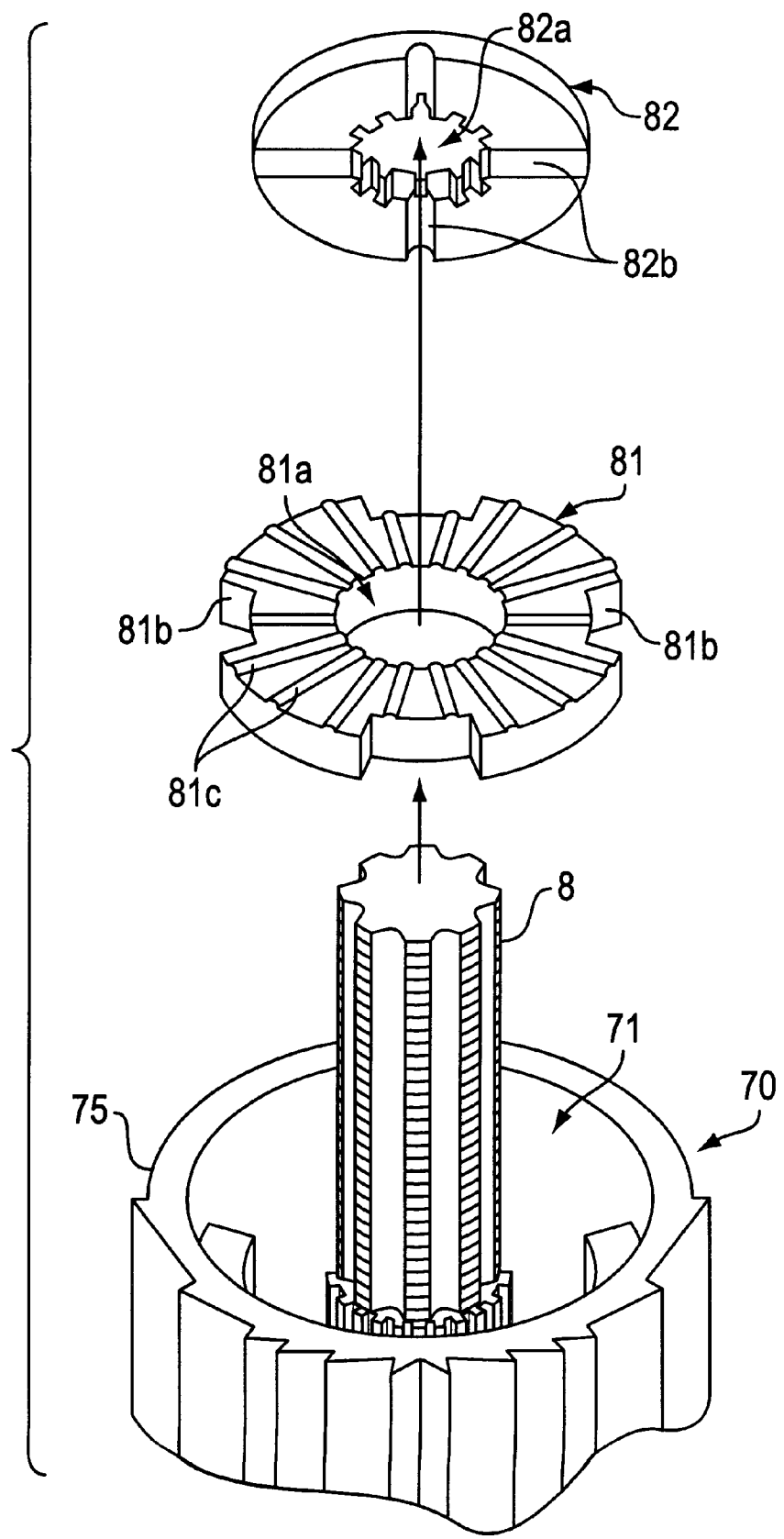
FIG. 7 is an exploded perspective view of a particular embodiment of a positioning mechanism according to the present invention.

In the case of the pivoting operating body 30, as is shown in FIG. 6, the second arm part 31, second finger contact part 32 and rotating plate 33 (which constitutes the second root part) are formed as an integral unit, and the rotating plate 33 is pivotably fit over the supporting shaft 8 via a bush 9b. Accordingly, when the second finger contact part 32 is pressed, the rotating plate 33 pivots about the axial center X of the supporting shaft 8. The transitional part between the second arm part 31 and the rotating plate 33, i.e., the root of the second arm part 31, is designed so that it contacts the other side surface of the stopper 10a formed by a portion of the cam member 10 in the pivoting track of the root of the second arm part 31. Furthermore, the second arm part 31 is driven by a return spring 11b in the direction which causes contact between the second arm part 31 and the stopper 10a. The position in which the second arm part 31 and stopper 10a are in contact with each other constitutes the home position HP2 of the rotating plate 33 and operating body 30. The pivoting operating body 30 is operated with this home position as a starting point.

Regardless of any restrictions on the attachment position of the take-up body (70), the first and second finger contact parts (22,32) can easily be set in positions which are convenient for the fingers of the hand gripping the handlebar grip, since the finger contact parts (22,32) are located in positions distant from the take-up body. Furthermore, if the system is constructed so that the first finger contact part (22) is displaced in substantially the same plane as the plane of the pivoting track of the second finger contact part (32), i.e., if the first finger contact part (22) is positioned on a line constituting a direct extension of the pivoting range of the second finger contact part (32), then the two operating bodies can be operated by a bending motion and a pivoting motion of the thumb of the hand gripping the handlebar grip. Here, the above expression to the effect that "the first finger contact part (22) is displaced in substantially the same plane as the plane of the pivoting track of the second finger contact part (32)" is to be interpreted merely as indicating that there is no great expansion in the direction of width of the first finger contact part (22) and second finger contact part (32) regardless of how said finger contact parts are displaced. In other words, this expression is not to be interpreted in a strict mathematical sense. As a result of such an arrangement, two motions of the thumb which are desirable from the standpoint of human engineering can be utilized for shifting operations.

When the sliding operating body 20 is positioned in the home position HP1, the tip of the first feeding pawl 51 rides up on a first cam part 10b formed on the circumference of the cam member 10. Accordingly, as a result of being pushed upward by the first cam part 10b of the cam member 10, the first feeding pawl 51 is released from the first ratchet part 72, so that rotation of the take-up body 70 by the pivoting operating body 30 is made possible. When the sliding operating body 20 slides in the direction indicated by the arrow from the home position HP1, the first feeding pawl 51 is released from the first cam part 10b and is caused to pivot toward the first ratchet part 72 by the driving force of the first pawl spring 52. Thereafter, the feeding pawl 51 engages with one of the plurality of ratchet teeth of the first ratchet part 72, thus coupling the sliding operating body 20 and the take-up body 70 so that the bodies rotate as a unit. When the sliding operating body 20 moves from a prescribed shift operating position to the home position HP1, the first feeding pawl 51 is pushed upward by the shape of the ratchet teeth of the first ratchet part 72, so that the engagement of the first feeding pawl 51 with the first ratchet part 72 is automatically released. Accordingly, when the sliding operating body 20 moves from the home position HP1 to the shift operating position, the first ratchet mechanism 50 transmits the sliding displacement of the sliding operating body 20 to the take-up body 70 to cause a take-up rotational operation of the take-up body 70. Thereafter, when the sliding operating body 20 slides from the shift operating position to the home position HP1, the engagement between the first feeding pawl 51 and the first ratchet part 72 is released, thus making it possible for the sliding operating body 20 to return to the home position HP1 while the take-up body 70 remains in a prescribed shift position.

When the pivoting operating body 30 is positioned in the home position HP2, the tip of the second feeding pawl 61 rides up on a second cam part 10c formed on the circumference of the cam member 10. Accordingly, as a result of being pushed upward by the second cam part 10c of the cam member 10, the second feeding pawl 61 is released from the second ratchet part 73, so that rotation of the take-up body 70 by the sliding operating body 20 is made possible. When the pivoting operating body 30 pivots in the direction indicated by the arrow from the home position HP2, the second feeding pawl 61 is released from the second cam part 10c and is caused to pivot toward the second ratchet part 73 by the driving force of the second pawl spring 62. Thereafter the feeding pawl 61 engages with one of the plurality of ratchet teeth of the second ratchet part 73, thus coupling the pivoting operating body 30 and the take-up body 70 so that the bodies rotate as a unit. When the pivoting operating body 30 pivots from a prescribed shift operating position to the home position HP2, the second feeding pawl 61 is pushed upward by the shape of the ratchet teeth of the second ratchet part 73, so that the engagement of the second feeding pawl 61 with the ratchet part 72 is automatically released. Accordingly, when the pivoting operating body 30 pivots from the home position HP2 to the shift operating position, the second ratchet mechanism 60 transmits the pivoting displacement of the pivoting operating body 30 to the take-up body 70 to cause a pay out rotational operation of the take-up body 70. Thereafter, when the pivoting operating body 30 pivots from the shift operating position to the home position HP2, the engagement between the second feeding pawl 61 and the second ratchet part 73 is released, thus making it possible for the pivoting operating body 30 to return to the home position HP2 while the take-up body 70 remains in a prescribed shift position. In this embodiment, the first finger contact part 22 is displaced in the same plane P as the plane of the path of movement of the second finger contact part 32 as shown in FIG. 3.

The positioning mechanism 80 is constructed from a first positioning plate 81 and second positioning plate 82 which are fit over the supporting shaft 8 inside the take-up body 70, and a pair of coned disk springs 83 which are fit over the supporting shaft 8 between the first positioning plate 81 and the bottom surface of a recessed part 71. As shown in FIG.

7, a circular through-hole 81a is formed in the central portion of the first positioning plate 81, and spline projections 81b are formed on the circumference of the first positioning plate 81. This through-hole 81a is used to fit the first positioning plate 81 over the supporting shaft 8, and the spline projections 81b are inserted into the spaces between a plurality of radially oriented projecting parts formed on the inside circumferential surface of a tube-form part 75 which forms the recessed part 71 of the take-up body 70. Thus, the first positioning plate 81 can slide along the supporting shaft 8 and rotates as a unit with the take-up body 70. The second positioning plate 82 is spline-engaged with the supporting shaft 8 by means of a spline hole 82a, and the second positioning plate 82 is positioned with respect to its upper limit by means of a tightening nut 84 via a spacer 85.

Coned disk springs 83 drive the first positioning plate 81 toward the second positioning plate 82 so that a plurality of projecting strips 81c formed on the first positioning plate 81 respectively enter a plurality of recessed grooves 82b formed in the second positioning plate 82. When the positioning mechanism 80 is in this engaged state, the second positioning plate 82 fastened to the supporting shaft 8 stops the rotation of the take-up body 70 via the first positioning plate 81. However, when the take-up body 70 is caused to pivot by an operating force which exceeds a set force determined by the spring force of the coned disk springs 83, the first positioning plate 81 slides away from the second positioning plate 82 against the force of the coned disk springs 83, so that the engaged state is switched to a disengaged state in which the projecting strips 81c slip out of the recessed grooves 82b formed in the second positioning plate 82, thus allowing rotation of the take-up body 70. In other words, when an operating force exceeding the set force is applied, the positioning mechanism 80 assumes a disengaged state so that the take-up body 70 can rotate. Afterward, the positioning mechanism 80 positions the take-up body 70 in the prescribed shift position by again switching from a disengaged state to an engaged state.

The shifting operation of this shifter operating device 5 will be described below with reference to FIG. 3.

When the thumb of the hand gripping the handlebar grip is contacts the first finger contact part 22 and the sliding operating body 20 is caused to slide from the home position HP1 in the direction indicated by the arrow, i.e., toward the shift position, the first ratchet mechanism 50 transmits the sliding displacement of the sliding operating body 20 as a rotational displacement of the take-up body 70. As a result, the positioning mechanism 80 assumes a disengaged state, and the take-up body 70 rotates toward the take-up side so that the inner wire 4a is taken up. When the take-up body 70 reaches a prescribed shift position, the sliding operation of the sliding operating body 20 is stopped. At this point, the take-up body 70 is in a new shift position which is the target position of the shifting operation, so that the take-up of a prescribed length of the inner wire 4a is completed. At the same time, the positioning mechanism 80 switches from a disengaged state to an engaged state, so that the take-up body 70 is maintained in the new shift position. Meanwhile, the sliding operating body 20 is automatically returned to its home position HP1 by the return spring 11a. As a result, the first finger contact part 22 and second finger contact part 32 are again located adjacent to each other as shown in FIG. 3.

When the thumb of the hand gripping the handlebar grip contacts the second finger contact part 32 and the pivoting operating body 30 is caused to slide from the home position HP2 in the direction indicated by the arrow, the second ratchet mechanism 60 transmits the pivoting displacement of the pivoting operating body 30 as a rotational displacement of the take-up body 70. As a result, the positioning mechanism 80 assumes a disengaged state, and the take-up body 70 rotates toward the pay-out side so that the inner wire 4a is paid out. When the take-up body 70 reaches a prescribed shift position, the pivoting operation of the pivoting operating body 30 is stopped. At this point, the take-up body 70 is in a new shift position which is the target position of the shifting operation, so that the pay-out of a prescribed length of the inner wire 4a is completed. At the same time, the positioning mechanism 80 switches from a disengaged state to an engaged state, so that the take-up body 70 is maintained in the new shift position. Meanwhile, the pivoting operating body 30 is automatically returned to its home position HP1 by the return spring 11b. As a result, the first finger contact part 22 and second finger contact part 32 are again located adjacent to each other as shown in FIG. 3.

In regard to the positioning mechanism 80 which maintains the position of the take-up body 70, it would also be possible to use a means in which this positioning is accomplished by friction between a positioning member on the fixed side and a positioning member on the take-up body side, instead of using a construction in which the positioning is accomplished by engaging means as in the embodiment described above. Furthermore, it would also be possible to use a so-called "index shifting mechanism" in which shifting one speed at a time is realized by means of a pivoting anchoring pawl which acts to link the sliding operating body 20 and pivoting operating body 30. In other words, the term "positioning mechanism 80" use here may refer to any universally known mechanism for temporarily maintaining the position of the take-up body 70.

Figure 8:
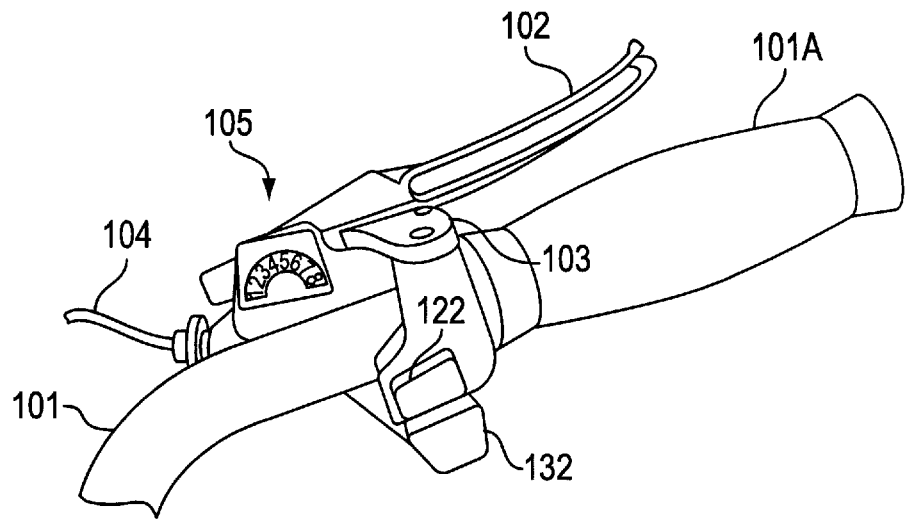
FIG. 8 is a perspective view of an alternative embodiment of a shifter operating device according to the present invention.
Figure 9:
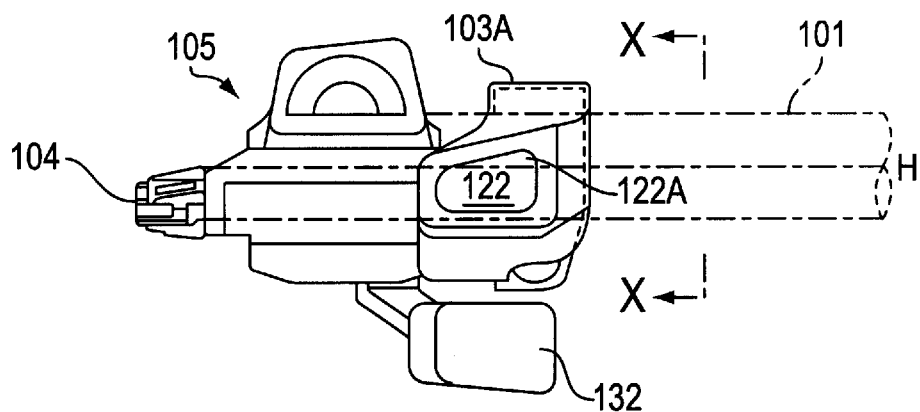
FIG. 9 is a front view of the shifter operating device shown in FIG. 8.
Figure 10:
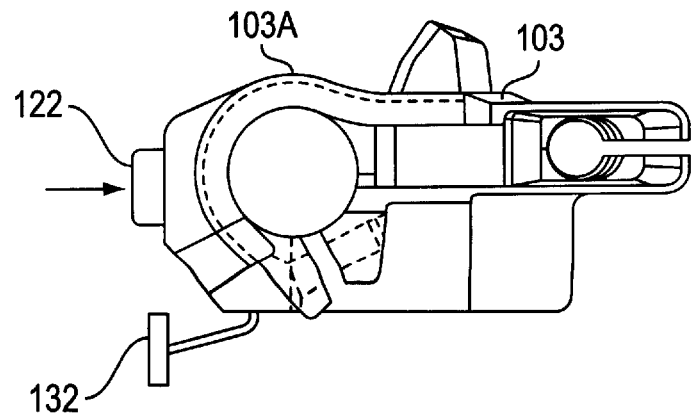
FIG. 10 is a view taken along line X—X in FIG. 9.

FIG. 8 is a perspective view of an alternative embodiment of a shifter operating device according to the present invention. As shown in FIG. 8, a brake bracket 103 which pivotally supports a brake lever 102 is fastened in place adjacent to a grip 101a formed on the handlebar 101 of a bicycle. A shifter operating device 105 which pulls and releases a shifter cable 104 is attached to the side surface of this brake bracket 103. Bracket 103 has an annular sleeve portion 103a which fits around handlebar 101 to fasten bracket 103 to handlebar 101 in a known manner. An arm-shaped linearly sliding operating body 120 (FIGS. 12 and 13) of the shifter operating device 105 extends from below the handlebar 101, curves with the sleeve portion 103a and terminates in front of handlebar 101. A finger contacting part 122 of operating body 120, in the form of a button, is disposed within sleeve portion 103a. Finger contacting part 122 moves toward handlebar 101 when operating body 120 is operated. As can be ascertained from FIG. 9, a portion 122a of finger contacting part 122 will move toward a central axis H of handlebar 101 when operating body 120 is operated.

A pivoting operating body 130 of the shifter operating device 105 also extends below the handlebar 101. A finger contacting part 132 of operating body 130, in the form of a button, is disposed beneath finger contacting part 122 of operating body 120. As a result, operation of both levers is possible with the thumb of the hand gripping the handlebar grip 101a.

Figure 11:
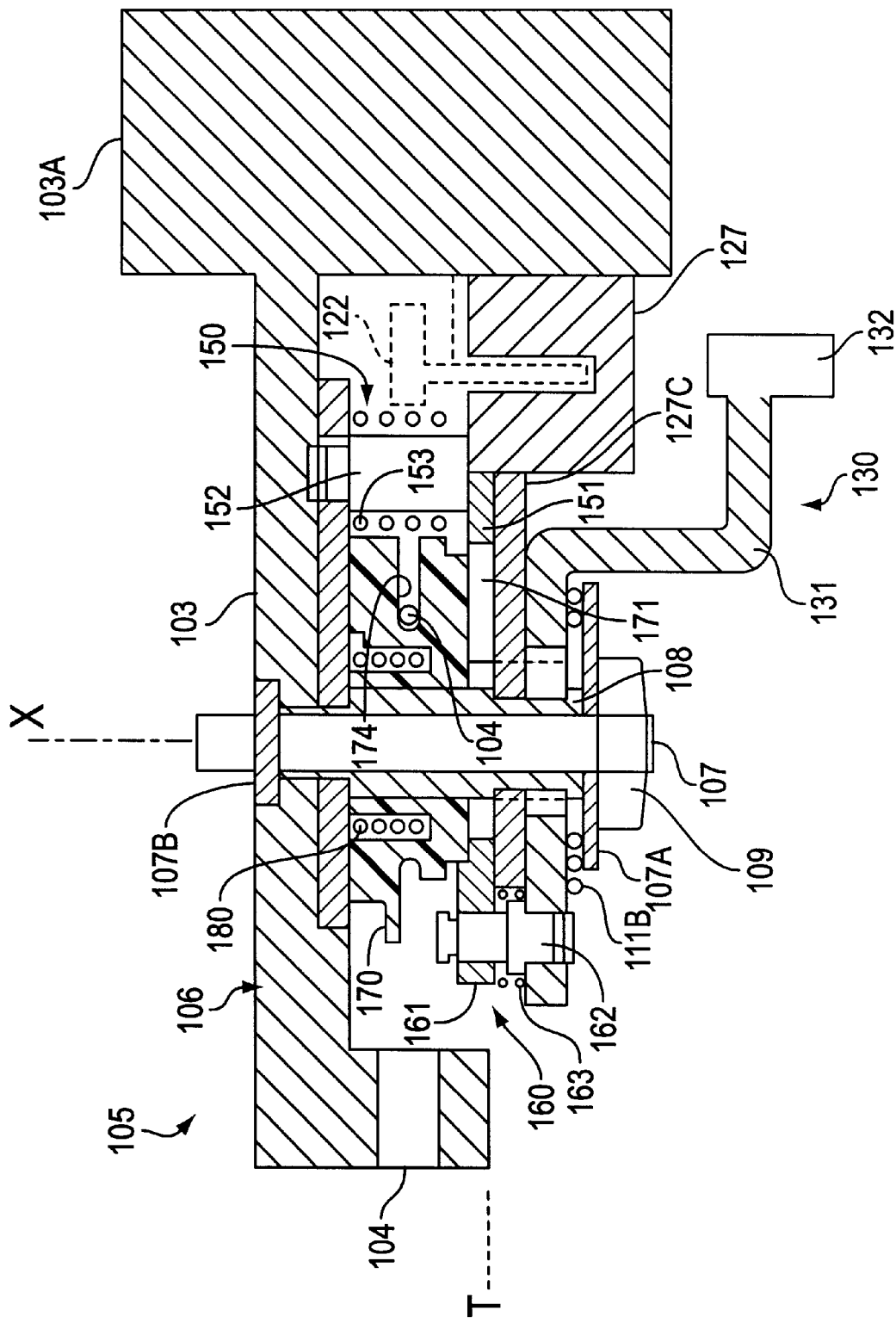
FIG. 11 is a cross sectional view of the main portions of the shifter operating device shown in FIG. 8.
Figure 12:
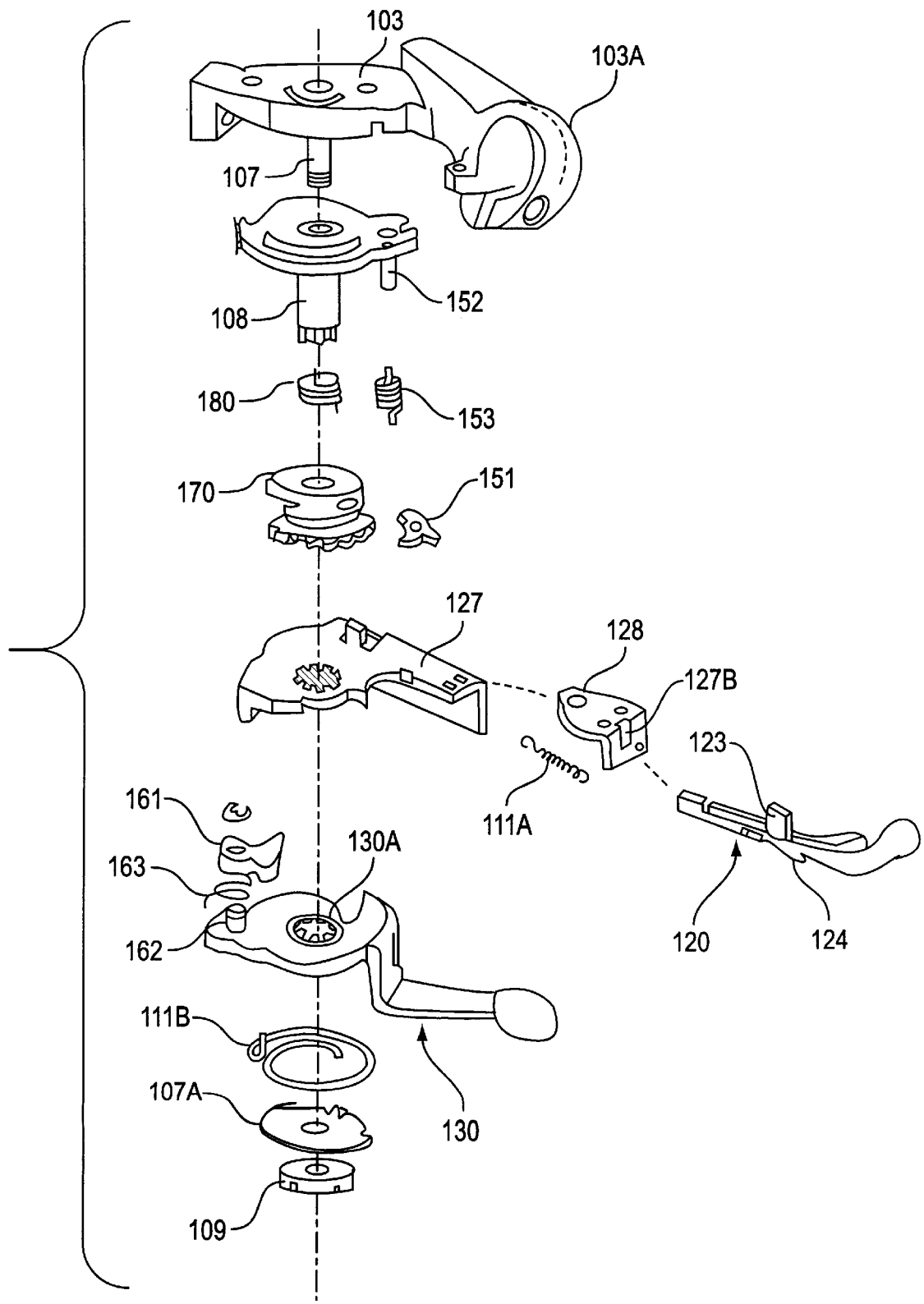
FIG. 12 is an exploded view of the shifter operating device shown in FIG. 12.

As is shown in FIGS. 11 and 12, the shifter operating device 105 includes a supporting shaft 108 which is rigidly fastened by means of an attachment bolt 107 and washers 107a and 107b to a bracket 106 which, in turn, may be formed as an integral part of the brake bracket 103. A take-up body 170 is rotatably mounted around supporting shaft 108.

A first ratchet mechanism 150, used as a first transmission means, transmits the displacement of sliding operating body 120 to the take-up body 170 to cause the rotation of the take-up body 170 in one direction, and a second ratchet mechanism 160, used as a second transmission means, transmits the displacement of pivoting operating body 130 to the take-25 up body 170 to cause the rotation of the take-up body 170 in the other direction. In this embodiment, displacement of pivoting operating body 130 causes the take-up body 170 to pull on cable 104, and displacement of sliding operating body 120 causes the take-up body 170 to release cable 104.

Figure 13:
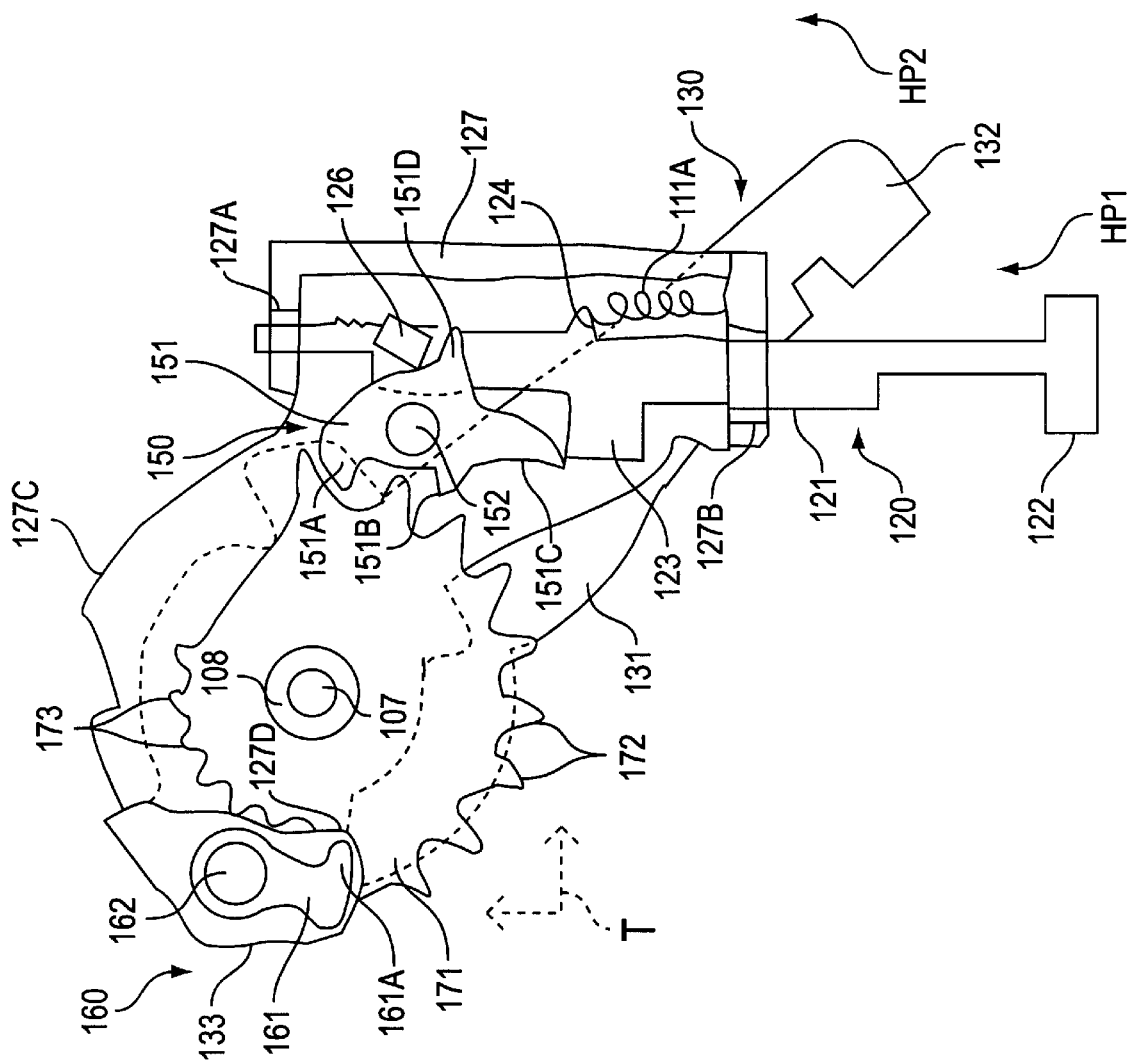
FIG. 13 is a detailed view of the transmission mechanisms disposed between the operating levers and the control body.

The take-up body 170 is equipped with a drum part which is constructed so that the shifter cable 104 from a shifting mechanism (not shown) on the front or rear of the bicycle is taken up along a wire groove 174. By rotating in the forward direction or reverse direction with respect to the supporting shaft 108, the take-up body 170 takes up or pays out the shifter cable 104. Take-up body 170 is coupled to a drive plate 171 for integral rotation therewith. As shown in FIG. 13, drive plate 171 includes a plurality of drive teeth 173 and a plurality of position retaining teeth 172, all of which are disposed in a common plane T. The operation of drive plate 171 will be discussed in more detail below.

As shown in FIGS. 12 and 13, the sliding operating body 120 is equipped with a first arm part 121 which forms the main part of the sliding operating body, the first finger contact part 122 which is formed on the curved end of the first arm part 121 in order to allow finger operation, a pawl pushing part 123 extending from a side of the arm part 121, and a pawl stop part 126. Sliding operating body 121 is slidingly fitted within openings 127A and 127B of a bracket 127 attached to sleeve 103A. Bracket 127 also includes a bracket extension 127C that is fitted around support shaft 108 and a guide 128 containing opening 127B. A spring 111A is connected between bracket 127 and a spring retainer 124 projecting from a side of arm part 121 for biasing arm part 121, and hence finger contacting part 122, to the home position HP1 shown in FIG. 13.

The first ratchet mechanism 150 comprises a first pawl 151 which is rotatably attached to a pivot pin 152 mounted in bracket 103, the plurality of position retaining teeth 172 which are formed on the outer circumferential surface of the drive plate 171, and a spring 153 which drives the first pawl 151 counterclockwise in the direction of engagement with position retaining teeth 172. First pawl 151 includes pawl tips 151A and 151B, a pawl operating part 151C for engaging pawl pushing part 123 on arm 121, and a pawl limit part 151D for contacting limit part 126 on arm 121 to limit the counterclockwise rotation of pawl 151. The operation of first ratchet mechanism 150 will be discussed in more detail below.

The pivoting operating body 130 is equipped with a second arm part 131 which forms the main part of the pivoting operating body, the second finger contact part 132 which is formed on the tip of the second arm part 131 in order to allow finger operation, a pawl supporting part 133 and a splined bushing 130A for rotatably mounting pivoting operating body 130 to support shaft 108. A spring 111B is connected between washer 107A and second arm part 131 for biasing pivoting operating body 130, and hence finger contacting part 122, to the home position HP2 shown in FIG. 13. In this embodiment, as in the first embodiment, the path of motion of sliding operating body 120 is substantially parallel to the ratchet teeth plane T.

The second ratchet mechanism 160 comprises a second pawl 161 which is rotatably attached to a pivot pin 162, the plurality of drive teeth 173 formed on the outer circumferential surface of the drive plate 171, and a spring 163 which drives the second pawl 161 counterclockwise in the direction of engagement with drive teeth 173. When pivoting operating body 130 is in the home position shown in FIG. 13, a tip 161A of pawl 161 rests on a ledge 127D of bracket part 127C, shown more clearly in FIG. 14A and 14B, this uncoupling pawl 161 from drive plate 171b.

Figure 14B:
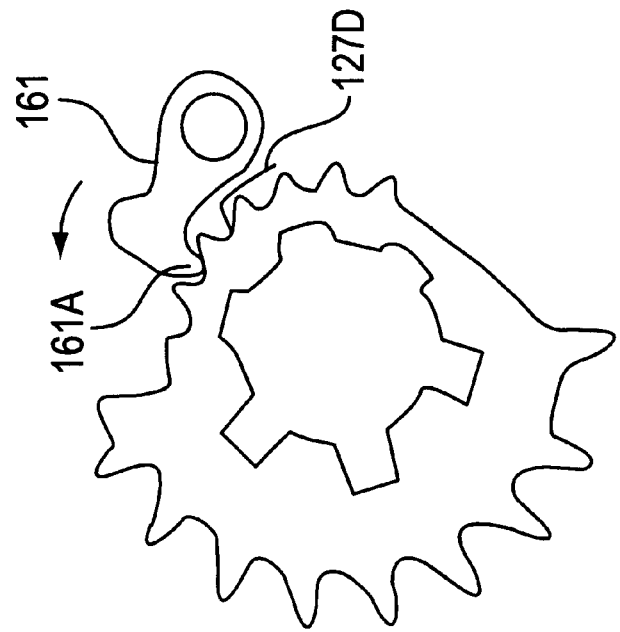
FIGS. 14A–14B are detailed views illustrating the operation of the pivoting lever shown in FIG. 13.
Figure 14A:
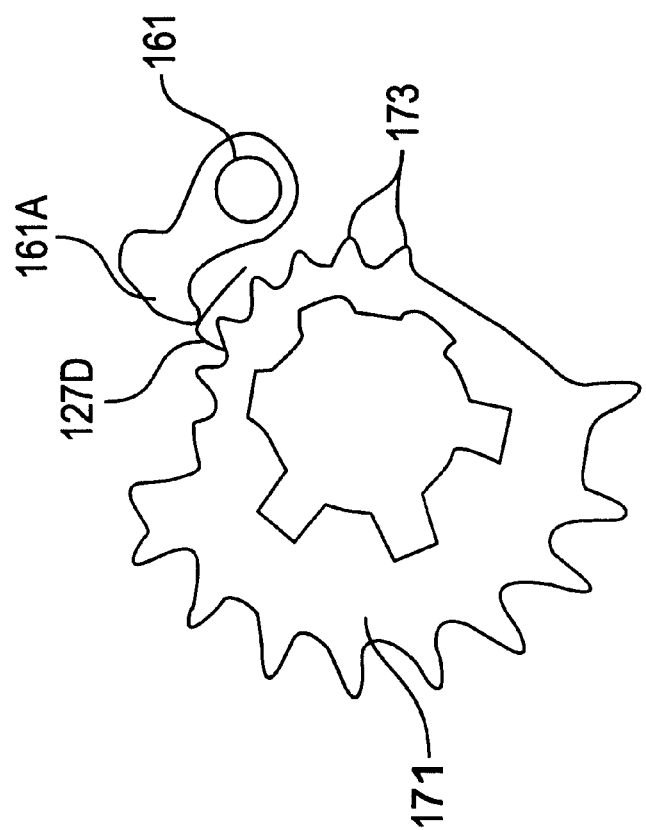
Figure 15A:
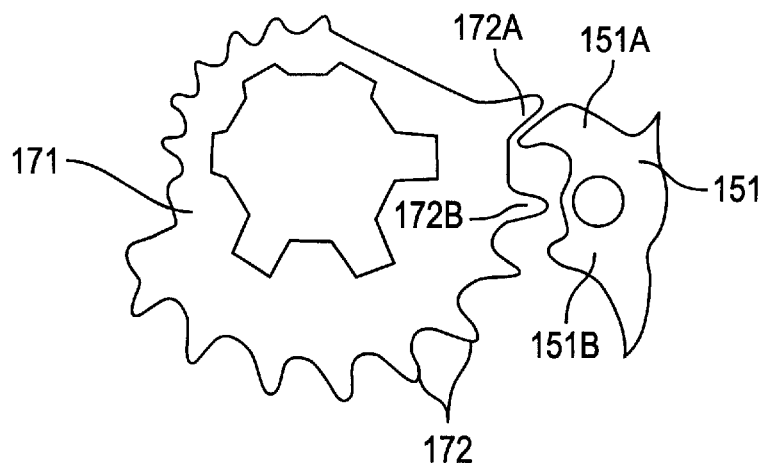
FIGS. 15A–15C are detailed views showing the operation of the position retaining pawl during operation of the pivoting lever shown in FIG. 13.
Figure 15B:
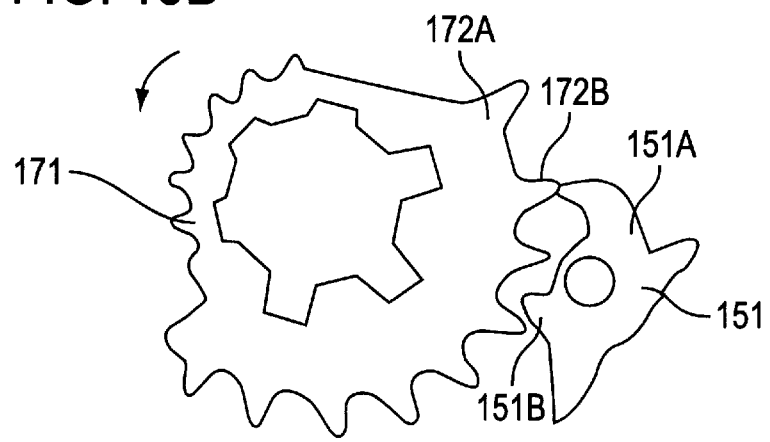
Figure 15C:
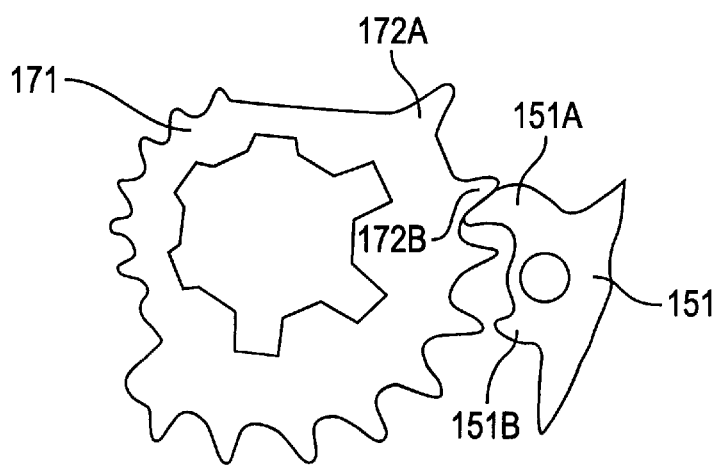

When the thumb of the hand gripping the handlebar grip contacts the second finger contact part 132 and the pivoting operating body 130 is caused to pivot from the home position in the direction indicated by the arrow in FIG. 13, pawl 161 moves counterclockwise as shown in FIGS. 14A and 14B, and tip 161A of pawl 161 moves off the ledge 127C into engagement with an adjacent drive tooth 173. Further pivoting of pivoting operating body 130 causes pawl tip 161A to rotate drive plate counterclockwise to wind shifter cable 104 around take-up part 170. At the same time, as shown in FIGS. 15A and 15B, a position retaining tooth 172B pushes against pawl tip 151A, thus causing pawl 151 to rotate clockwise against the biasing force of spring 153. As drive plate 171 rotates further, position retaining tooth 172B moves past pawl tip 151A, and pawl 151 moves counterclockwise with the biasing force of spring 153. When pivoting operating body 130 is returned to its home position, pawl tip 161A of pawl 161 climbs back up on ledge 127D, but pawl tip 151A of pawl 151 abuts against position retaining tooth 172B as shown in FIG. 15C to maintain drive plate 171, and hence take-up element 170, in the desired rotational position. The same sequence occurs for shifts to the remaining drive teeth 173.

Figure 16A:
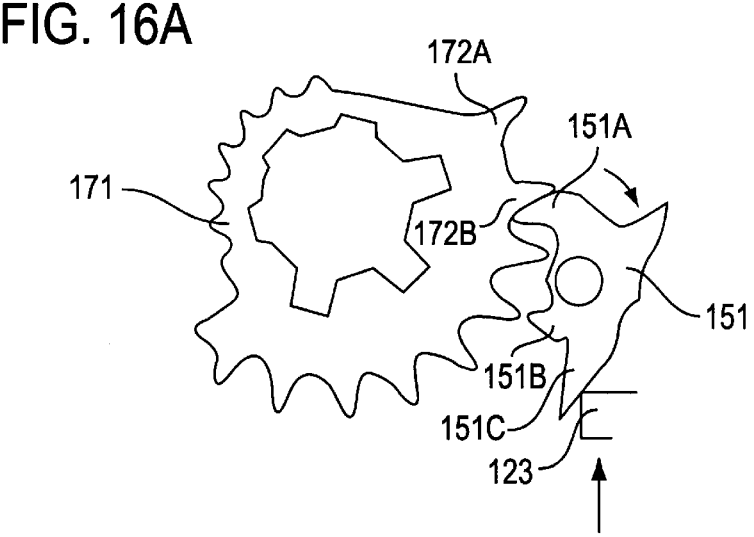
FIGS. 16A–16C are detailed views illustrating the operation of the sliding lever shown in FIG. 13.
Figure 16B:
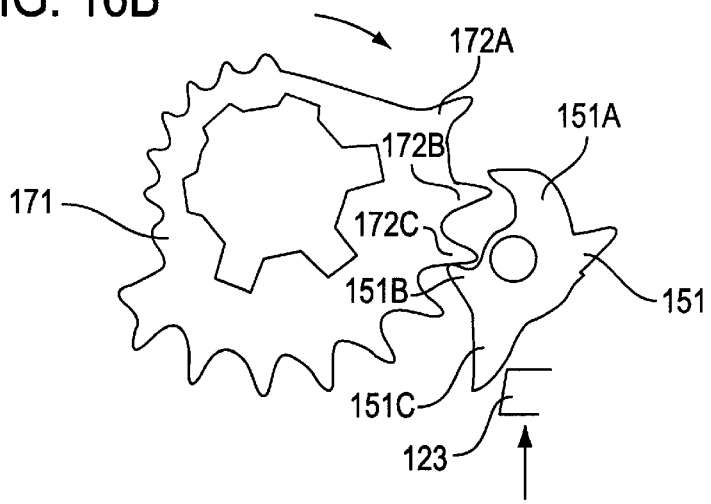
Figure 16C:
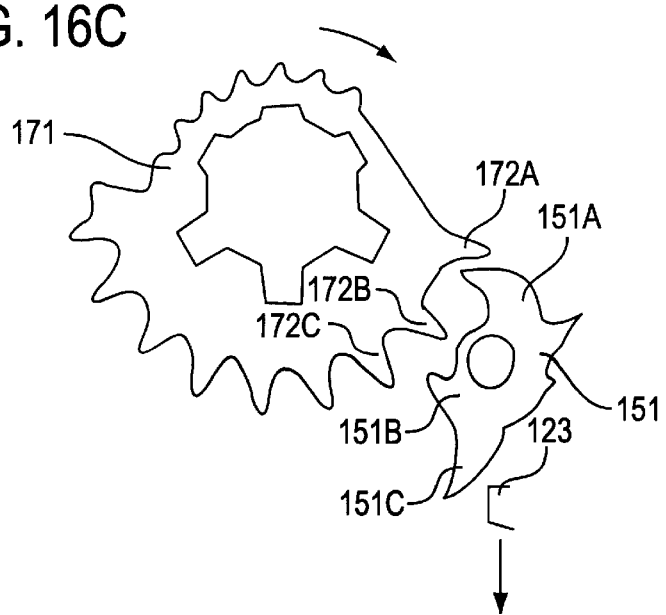

To rotate take-up element 170 in the opposite direction from this position, the thumb of the hand gripping the handlebar grip contacts the first finger contact part 122, and the sliding operating body 120 is caused to slide linearly from the home position in the direction indicated by the arrow in FIG. 13, and pawl pushing part 123 presses against pawl operating part 151C, thus causing pawl 151 to rotate clockwise against the biasing force of spring 153 as shown in FIG. 16A. When pawl 151 rotates to the position where pawl tip 151A clears position retaining tooth 172B, drive plate 171 immediately rotates clockwise as a result of the biasing force of spring 180 until position retaining tooth 172C abuts against pawl tip 151B as shown in FIG. 16B. When sliding operating body 120 is allowed to move back to its home position, pawl 151 rotates counterclockwise as a result of the biasing force of spring 163. As soon as pawl tip 151B clears position retaining tooth 172C, drive plate 171 continues rotating clockwise as shown in FIG. 16C. However, pawl tip 151A then abuts against position retaining tooth 172B to prevent further rotation of drive plate 171. As a result, drive plate 171, and hence take-up element 170, is maintained in the desired position. The same sequence occurs for shifts among the remaining position retaining teeth 172.

Because sliding operating body 120 operates pawl 151 by pressing pawl pressing part 123 against pawl operating part 151 C, very little movement (e.g., 5 millimeters) is required to operate pawl 151. As a result, sliding operating body 120 may be curved to follow the contour of sleeve 103A so that finger contacting part 122 may be disposed in front of handlebar 101 at the approximate plane of the rider's palm. Because of the short operating stroke of sliding operating body 120, handlebar 101 does not interfere with the operation of sliding operating body 120.

While the above is a description of various embodiments of the present invention, further modifications may be employed without departing from the spirit and scope of the present invention. For example, operating body 20 or 120 may cause take-up body 70 or 170 to rotate in the cable pay out direction, and operating body 30 130 may cause take-up body 70 or 170 to rotate in the cable take-up direction. If desired, operating body 20 or 120 may be constructed for pivoting displacement, and operating body 30 or 130 may be constructed for sliding displacement. Both operating bodies 20, 120, 30 and 130 may be sliding operating bodies. While the path of movement of each sliding operating body 20 and 120 in the above embodiments is substantially parallel to the plane of the ratchet teeth T, the path may vary, for example, by plus or minus thirty degrees.

Thus, the scope of the invention should not be limited by the specific structures disclosed. Instead, the true scope of the invention should be determined by the following claims. Of course, although labeling symbols are used in the claims in order to facilitate reference to the figures, the present invention is not intended to be limited to the constructions in the appended figures by such labeling.

What is claimed is:

1. A bicycle shifter operating device (5,105) which operates a shifting mechanism via a shifter cable (4,104), said shifter operating device (5,105) comprising:

a control body (70,170) rotatable about an axis (X) for controlling the shifter cable (4,104);

a linear operating body (20,120) which forms a first finger contact part (22,122) in a position spaced apart from the control body (70,170) and which is coupled to the operating device (5,105) for linear displacement between a first home position and a first shift position;

a second operating body (30,130) which forms a second finger contact part (32,132) in a position spaced apart from the control body (70,170) and which is coupled to the operating device (5,105) for displacement between a second home position and a second shift position;

a first transmission (50,150) which converts the linear displacement of the linear operating body (20,120) from the first home position to the first shift position into a rotational displacement of the control body (70,170), wherein the first transmission includes a plurality of ratchet teeth (72,172) disposed in a ratchet teeth plane (T);

a second transmission (60,160) which converts the displacement of the second operating body (30,130) from the second home position to the second shift position into a rotational displacement of the control body (70,170); and wherein a path of movement of the linear operating body (20,120) is substantially parallel to the ratchet teeth plane (T).

2. A bicycle shifter operating device (5,105) which operates a shifting mechanism via a shifter cable (4,104), said shifter operating device (5,105) comprising:

a control body (70,170) rotatable about an axis (X) for controlling the shifter cable (4,104);

a linear operating body (20,120) which forms a first finger contact part (22,122) having a first finger contact surface in a position spaced apart from the control body (70,170) and which is coupled to the operating device (5,105) for linear displacement between a first home position and a first shift position in response to pressing the first finger contact surface;

a second operating body (30,130) which forms a second finger contact part (32,132) having a second finder contact surface in a position spaced apart from the control body (70,170) and which is coupled to the operating device (5,105) for displacement between a second home position and a second shift position in response to pressing the second finger contact surface;

wherein the first finger contact surface faces in the same general direction as the second finder contact surface:

a first transmission (50,150) which converts the linear displacement of the linear operating body (20,120) from the first home position to the first shift position into a rotational displacement of the control body (70,170);

a second transmission (60,160) which converts the displacement of the second operating body (30,130) from the second home position to the second shift position into a rotational displacement of the control body (70,170); and wherein, when the linear operating body (20,120) is located at the first home position and the second operating body (30,130) is located at the second home position, the first finger contact part (22,122) is disposed in close proximity to the second finger contact part (32,132).

3. The device according to claim 2 wherein the second operating body (30,130) is coupled to the operating device (5,105) for pivoting displacement between the second home position and the second shift position.

4. The device according to claim 2 further comprising:

a first biasing means (11a,111a) for biasing the linear operating body (20,120) to the first home position; and a second biasing means (11b,111b) for biasing the second operating body (30,130) to the second home position.

5. The device according to claim 2 further comprising a mounting member (3,103) for mounting the shifting device to a handlebar of the bicycle.

6. The device according to claim 5 wherein the first finger contacting part (22,122) moves toward the handlebar when the first operating body (20,120) moves from the first home position to the first shift position.

7. A bicycle shifter operating device (5,105) which operates a shifting mechanism via a shifter cable (4,104) said shifter operating device (5,105) comprising:

a control body (70,170) rotatable about an axis (X) for controlling the shifter cable (4,104);

a linear operating body (20,120) which forms a first finger contact part (22,122) in a position spaced apart from the control body (70,170) and which is coupled to the operating device (5,105) for linear displacement between a first home position and a first shift position, a second operating body (30,130) which forms a second finger contact part (32,132) in a position spaced apart from the control body (70,170) and which is coupled to the operating device (5,105) for displacement between a second home position and a second shift position;

a first transmission (50,150) which converts the linear displacement of the linear operating body (20,120) from the first home position to the first shift position into a rotational displacement of the control body (70,170);

a second transmission (60,160) which converts the displacement of the second operating body (30,130) from the second home position to the second shift position into a rotational displacement of the control body (70,170);

wherein when the linear operating body (20,120) is located at the first home position and the second operating body (30,130) is located at the second home position the first finger contact part (22,122) is disposed in close proximity to the second finger contact part (32,132);

wherein the linear operating body (20) extends away from the axis (X) so that a free end of the linear operating body (20) forms the first finger contact part, and wherein the second operating body (30) extends away from the axis (X) in the same general direction as the linear operating body (20) so that a free end of the second operating body (30) forms the second finger contact part (32).

8. The device according to claim 7 wherein the first finger contact part (22) is displaced in substantially the same plane (P) as the plane of the path of movement of the second finger contact part (32).

9. The device according to claim 8 wherein the first finger contact part (22) is disposed adjacent to the second finger contact part (32).

10. A bicycle shifter operating device (5,105) which operates a shifting mechanism via a shifter cable (4,104), said shifter operating device (5,105) comprising:

a mounting member (3,103) for mounting the shifting device to a handlebar of the bicycle;

a control body (70,170) rotatable about an axis () for controlling the shifter cable (4,104);

a linear operating body (20,120) which forms a first finger contact part (22,122) in a position spaced apart from the control body (70,170) and which is coupled to the operating device (5,105) for linear displacement between a first home position and a first shift position;

a second operating body (30,130) which forms a second finger contact part (32,132) in a position spaced apart from the control body (70,170) and which is coupled to the operating device (5,105) for displacement between a second home position and a second shift position;

a first transmission (50,150) which converts the linear displacement of the linear operating body (20,120) from the first home position to the first shift position into a rotational displacement of the control body (70,170);

a second transmission (60,160) which converts the displacement of the second operating body (30,130) from the second home position to the second shift position into a rotational displacement of the control body (70,170);

wherein, when the linear operating body (20,120) is located at the first home position and the second operating body (30,130) is located at the second home position, the first finger contact part (22,122) is disposed in close proximity to the second finger contact part (32,132);

wherein the first finger contacting part (22,122) moves toward the handlebar when the first operating body (20,120) moves from the first home position to the first shift position; and wherein the control body (70) is supported on a side of a bracket (3) of a brake operating device, wherein the linear operating body (20) extends above the bracket (3), and wherein the second operating body (30) extends below the bracket (3).

11. A bicycle shifter operating device (5,105) which operates a shifting mechanism via a shifter cable (4,104). said shifter operating device (5,105) comprising:

a mounting member (3,103) for mounting the shifting device to a handlebar of the bicycle;

a control body (70,170) rotatable about an axis (x) for controlling the shifter cable (4,104);

a linear operating body (20,120) which forms a first finger contact part (22,122) in a position spaced apart from the control body (70,170) and which is coupled to the operating device (5,105) for linear displacement between a first home position and a first shift position;

a second operating body (30,130) which forms a second finger contact part (32,132) in a position spaced apart from the control body (70,170) and which is coupled to the operating device (5,105) for displacement between a second home position and a second shift position;

a first transmission (50,150) which converts the linear displacement of the linear operating body (20,120) from the first home position to the first shift position into a rotational displacement of the control body (70,170);

a second transmission (60,160) which converts the displacement of the second operating body (30,130) from the second home position to the second shift position into a rotational displacement of the control body (70,170);

wherein, when the linear operating body (20,120) is located at the first home position and the second operating body (30,130) is located at the second home position, the first finger contact part (22,122) is disposed in close proximity to the second finger contact part (32,132);

wherein the first finger contacting part (22,122) moves toward the handlebar when the first operating body (20,120) moves from the first home position to the first shift position; and wherein the control body (170) is supported on a side of a bracket (103) of a brake operating device, and wherein both the linear operating body (120) and the second operating body (130) extend below the bracket (103).

12. A bicycle shifter operating device (5,105) which operates a shifting mechanism via a shifter cable (4,104), said shifter operating device (5,105) comprising:

a mounting member (3,103) for mounting the shifting device to a handlebar of the bicycle;

a control body (70,170) rotatable about an axis (X) for controlling the shifter cable (4,104);

a linear operating body (20,120) which forms a first finger contact part (22,122) in a position spaced apart from the control body (70,170) and which is coupled to the operating device (5,105) for linear displacement between a first home position and a first shift position;

a second operating body (30,130) which forms a second finger contact part (32,132) in a position spaced apart from the control body (70,170) and which is coupled to the operating device (5,105) for displacement between a second home position and a second shift position, a first transmission (50,150) which converts the linear displacement of the linear operating body (20,120) from the first home position to the first shift position into a rotational displacement of the control body (70,170); a second transmission (60,160) which converts the displacement of the second operating body (30,130) from the second home position to the second shift position into a rotational displacement of the control body (70,170);

wherein, when the linear operating body (20,120) is located at the first home position and the second operating body (30,130) is located at the second home position, the first finger contact part (22,122) is disposed in close proximity to the second finger contact part (32,132);

wherein the first finger contacting part (22,122) moves toward the handlebar when the first operating body (20,120) moves from the first home position to the first shift position; and wherein the mounting member comprises a sleeve (103A) for fitting around the handlebar, and wherein the first finger contacting part (122) is disposed within the sleeve.

13. The device according to claim 12 wherein a portion (122A) of the first finger contacting part (122) moves toward a central axis (H) of the handlebar when the first operating body (120) moves from the first home position to the first shift position.

14. The device according to claim 12 further comprising:
a first biasing means (111a) for biasing the linear operating body (120) to the first home position; and
a second biasing means (111b) for biasing the second operating body (130) to the second home position.

15. The device according to claim 12 wherein the linear operating body (120) bends together with a portion of the sleeve.

16. A bicycle shifter operating device (5,105) which operates a shifting mechanism via a shifter cable (4,104), said shifter operating device (5,105) comprising:
a mounting member (3,103) for mounting the shifter operating device (5,105) to a handlebar (1,101);
a control body (70,170) rotatable about an axis (X) for controlling the shifter cable (4,104);
a first operating body (20,120) which forms a first finger contact part (22,122) in a position spaced apart from the control body (70,170) and which is coupled to the operating device (5,105) for displacement between a first home position and a first shift position;
a second operating body (30,130) which forms a second finger contact part (32,132) in a position spaced apart from the control body (70,170) and which is coupled to the operating device (5,105) for displacement between a second home position and a second shift position;
a first transmission (50,150) which converts the displacement of the first operating body (20,120) from the first home position to the first shift position into a rotational displacement of the control body (70,170);
a second transmission (60,160) which converts the displacement of the second operating body (30,130) from the second home position to the second shift position into a rotational displacement of the control body (70,170);

wherein the first finger contacting part (22,122) moves toward the handlebar when the first operating body (20,120) moves from the first home position to the first shift position and wherein the first finger part (22,122) is structured for overlapping the handlebar when viewed in a direction of movement of the first finger contacting part (22,122).

17. The device according to claim 16 wherein the control body (170) is supported on a side of a bracket (103) of a brake operating device, and wherein both the first operating body (120) and the second operating body (130) extend below the bracket (103).

18. The device according to claim 16 wherein the mounting member (3,103) comprises a sleeve (103A) for fitting around the handlebar (101).

19. The device according to claim 18 wherein the first finger contacting part (122) is disposed within the sleeve (103A).

20. The device according to claim 18 wherein the first operating body (120) bends together with a portion of the sleeve (103A).

21. The device according to claim 16 wherein a portion of the first finger contacting part (122) moves toward a central axis (H) of the handlebar (101) when the first operating body (120) moves from the first home position to the first shift position.

22. The device according to claim 16 further comprising:
a first biasing means (111a) for biasing the first operating body (120) to the first home position; and
a second biasing means (111b) for biasing the second operating body (130) to the second home position.

* * * * *